(12) United States Patent
Binette et al.

(10) Patent No.: US 9,713,748 B2
(45) Date of Patent: Jul. 25, 2017

(54) GOLF BALL WITH EXCELLENT INTERLAYER ADHESION BETWEEN ADJACENT DIFFERING LAYERS

(71) Applicant: Acushnet Company, Fairhaven, MA (US)

(72) Inventors: Mark L. Binette, Mattapoisett, MA (US); Brian Comeau, Berkley, MA (US); Michael Michalewich, Norton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/943,314

(22) Filed: Nov. 17, 2015

(65) Prior Publication Data

US 2017/0136311 A1  May 18, 2017

(51) Int. Cl.
| | | |
|---|---|---|
| *C08L 83/00* | (2006.01) | |
| *A63B 37/00* | (2006.01) | |
| *B29C 67/24* | (2006.01) | |
| *B29K 105/00* | (2006.01) | |
| *B29L 31/54* | (2006.01) | |

(52) U.S. Cl.
CPC .......... *A63B 37/0075* (2013.01); *B29C 67/24* (2013.01); *B29K 2105/0005* (2013.01); *B29L 2031/546* (2013.01); *C08L 83/00* (2013.01)

(58) Field of Classification Search
CPC . B29L 2031/546; B09J 183/04; B09J 183/06; B09J 183/08; C08L 83/04; C08L 83/06; C08L 83/08; C08G 18/61; C08G 18/615
See application file for complete search history.

(56) References Cited

U.S. PATENT DOCUMENTS

| | | |
|---|---|---|
| 3,992,014 A | 11/1976 | Retford |
| 4,560,168 A | 12/1985 | Aoyama |
| 4,925,193 A | 5/1990 | Melvin et al. |
| 4,960,281 A | 10/1990 | Aoyama |
| 5,006,297 A | 4/1991 | Brown et al. |
| 5,248,878 A | 9/1993 | Ihara |
| 5,249,804 A | 10/1993 | Sanchez |
| 5,300,325 A | 4/1994 | Nealon et al. |
| 5,334,673 A | 8/1994 | Wu |
| 5,403,453 A | 4/1995 | Roth et al. |
| 5,456,972 A | 10/1995 | Roth et al. |
| 5,466,424 A | 11/1995 | Kusano et al. |
| 5,484,870 A | 1/1996 | Wu |
| 5,562,552 A | 10/1996 | Thurman |
| 5,575,477 A | 11/1996 | Hwang |
| 5,688,191 A | 11/1997 | Cavallaro et al. |
| 5,713,801 A | 2/1998 | Aoyama |
| 5,733,428 A | 3/1998 | Calabria et al. |
| 5,803,831 A | 9/1998 | Sullivan et al. |
| 5,820,488 A | 10/1998 | Sullivan et al. |
| 5,824,718 A | 10/1998 | Penfold et al. |
| 5,830,087 A | 11/1998 | Sullivan et al. |
| 5,849,168 A | 12/1998 | Lutz |
| 5,885,172 A | 3/1999 | Hebert et al. |
| 5,907,012 A | 5/1999 | Voss et al. |
| 5,919,100 A | 7/1999 | Boehm et al. |
| 5,957,787 A | 9/1999 | Hwang |
| 5,965,669 A | 10/1999 | Cavallaro et al. |
| 5,981,654 A | 11/1999 | Rajagopalan et al. |
| 5,981,658 A | 11/1999 | Rajagopalan et al. |
| 6,056,842 A | 5/2000 | Dalton et al. |
| 6,075,223 A | 6/2000 | Harrison |
| 6,096,255 A | 8/2000 | Brown et al. |
| 6,129,881 A | 10/2000 | Puniello |
| 6,149,535 A | 11/2000 | Bissonnette et al. |
| 6,180,040 B1 | 1/2001 | Ladd et al. |
| 6,180,722 B1 | 1/2001 | Dalton et al. |
| 6,207,784 B1 | 3/2001 | Rajagopalan |
| 6,213,898 B1 | 4/2001 | Ogg |
| 6,235,230 B1 | 5/2001 | Puniello |
| 6,290,615 B1 | 9/2001 | Ogg |

(Continued)

FOREIGN PATENT DOCUMENTS

| | | |
|---|---|---|
| GB | 1265596 | 3/1972 |
| JP | 57025867 | 2/1982 |

OTHER PUBLICATIONS

Dow Corning organosilane.*

*Primary Examiner* — John E Simms, Jr.
(74) *Attorney, Agent, or Firm* — Margaret C. Barker

(57) ABSTRACT

Golf ball and method for making it, comprising a first layer that comprises a first polymeric composition and is surrounded by and adjacent to a second layer comprising a second polymeric composition different than the first polymeric composition; with one of these layers further comprising at least one silane-containing adhesion promoter such as organosilanes and/or organosiloxanes throughout in an amount of from about 0.1 wt. % to about 5.0 wt. % of the entire layer. Neither layer is surface treated with at least one silane-containing adhesion promoter. The second layer may be the layer comprising the silane-containing adhesion promoter throughout, surrounded by a third layer that comprises a third polymeric composition that differs from the second polymeric composition and does not incorporate any silane-containing adhesion promoter. Strong interlayer bonding is therefore created both between the second layer and the first layer and between the second layer and the third layer.

22 Claims, No Drawings

(56) References Cited

U.S. PATENT DOCUMENTS

| | | |
|---|---|---|
| 6,290,797 B1 | 9/2001 | Gosetti et al. |
| 6,315,915 B1 | 11/2001 | Hebert et al. |
| 6,338,684 B1 | 1/2002 | Winfield et al. |
| 6,358,161 B1 | 3/2002 | Aoyama |
| 6,379,138 B1 | 4/2002 | Puniello et al. |
| 6,383,092 B1 | 5/2002 | Ogg |
| 6,384,136 B1 | 5/2002 | Rajagopalan et al. |
| 6,409,615 B1 | 6/2002 | McGuire et al. |
| 6,425,833 B1 | 7/2002 | Sullivan et al. |
| 6,462,303 B1 | 10/2002 | Brown |
| 6,585,607 B2 | 7/2003 | Tzivanis et al. |
| 6,800,690 B2 | 10/2004 | Rajagopalan |
| 6,869,645 B2 | 3/2005 | Brum |
| 6,905,423 B2 | 6/2005 | Morgan et al. |
| 6,960,629 B2 | 11/2005 | Voorheis et al. |
| 6,998,444 B2 | 2/2006 | Voorheis et al. |
| 7,198,576 B2 | 4/2007 | Sullivan et al. |
| 7,241,232 B2 | 7/2007 | Sullivan et al. |
| 7,244,196 B2 | 7/2007 | Kennedy, III et al. |
| 7,279,529 B2 | 10/2007 | Hogge et al. |
| 7,338,391 B2 | 3/2008 | Melanson et al. |
| 7,396,300 B2 | 7/2008 | Tzivanis et al. |
| 7,534,384 B2 | 5/2009 | Tzivanis et al. |
| 7,897,671 B2 * | 3/2011 | Rajagopalan ...... A63B 37/0031 473/371 |
| 8,475,881 B1 | 7/2013 | Melanson et al. |
| 8,956,488 B2 | 2/2015 | Kennedy, III |
| 2001/0009310 A1 | 7/2001 | Hebert et al. |
| 2001/0018375 A1 | 8/2001 | Hayashi et al. |
| 2001/0019971 A1 | 9/2001 | Hayashi et al. |
| 2002/0025862 A1 | 2/2002 | Sullivan et al. |
| 2002/0028885 A1 | 3/2002 | Sullivan et al. |
| 2002/0034988 A1 * | 3/2002 | Binette ............. A63B 37/0003 473/373 |
| 2002/0079615 A1 | 6/2002 | Puniello et al. |
| 2002/0082358 A1 | 6/2002 | Ohira et al. |
| 2002/0160862 A1 | 10/2002 | Morgan et al. |
| 2003/0004013 A1 | 1/2003 | Lutz et al. |
| 2003/0106442 A1 | 6/2003 | Gosetti |
| 2003/0114255 A1 | 6/2003 | Dalton et al. |
| 2003/0114624 A1 * | 6/2003 | Harris ................ A63B 37/0003 528/28 |
| 2003/0125134 A1 | 7/2003 | Nardacci |
| 2003/0158001 A1 | 8/2003 | Morgan et al. |
| 2003/0232666 A1 | 12/2003 | Sullivan |
| 2004/0192833 A1 * | 9/2004 | Rajagopalan ........... C08L 27/16 524/588 |
| 2004/0198940 A1 * | 10/2004 | Wu ........................ C08G 18/10 528/28 |
| 2005/0037866 A1 | 2/2005 | Emerson et al. |
| 2005/0269737 A1 | 12/2005 | Hogge et al. |
| 2008/0300069 A1 * | 12/2008 | Rajagopalan ...... A63B 37/0003 473/376 |
| 2009/0143170 A1 | 6/2009 | Ohira et al. |
| 2009/0291777 A1 * | 11/2009 | Rajagopalan ...... A63B 37/0003 473/371 |
| 2011/0244983 A1 | 10/2011 | Shen et al. |
| 2012/0231898 A1 * | 9/2012 | Sullivan .................. C08K 9/06 473/374 |

* cited by examiner

GOLF BALL WITH EXCELLENT INTERLAYER ADHESION BETWEEN ADJACENT DIFFERING LAYERS

FIELD OF THE INVENTION

The present invention relates to durable golf balls possessing excellent adhesive strength between differing adjacent layers (i.e., layers having different chemical and/or physical properties).

BACKGROUND OF THE INVENTION

Golf balls are made in a variety of constructions and compositions. In this regard, each of the golf ball core, intermediate layer, and cover may be single layered or comprise multiple layers. Examples of golf ball materials range from balata to polybutadiene, ionomer resins, polyurethanes, and/or polyureas. Typically, outer layers are formed about the spherical outer surface of an inner golf ball component via compression molding, casting, or injection molding.

Golf ball manufacturers continuously experiment with golf ball constructions and material formulations in order to target and improve aerodynamic and/or inertial properties and achieve desired feel without sacrificing durability. In this regard, sufficient adhesion between golf ball layers is essential in achieving adequate impact durability. Without a satisfactory amount of adhesion between these layers, both the impact durability as well as the shear resistance of the cover can suffer.

This issue typically presents when the materials of adjacent golf ball layers don't bond together well. For example, the bond strength or "adhesive strength" between an ionomeric casing/intermediate layer and a polyurethane cover layer may be unacceptably low.

Poor interlayer bond or adhesive strength can result in layer separation or "delamination" when the golf ball is struck by a club. Layer separation may be visually apparent as "bubbling" or air pockets between the two layers. Delamination detrimentally affects not only the appearance of the golf ball but playability as well. Accordingly, golf ball manufacturers look for cost effective compounds and methods for addressing this problem in order to preserve brand recognition and reputation.

Currently, several different types of adhesion promoting pre-treatment processes exist for addressing cut and shear issues caused by lack of adhesion between layers. Examples of pretreatments include surface roughening; surface energy modifications such as corona, plasma, and flame treatments; adhesives; adhesion promoters and combinations thereof. Adhesives are typically applied via spray or dip and usually require a drying and post cure step. Adhesion promoters are likewise usually applied by dip or spray, followed by rinsing and drying steps.

In this regard, silane adhesion promoter surface pretreatments and tie layers are known to improve interlayer adhesion between adjacent differing mated layers. See, e.g., commonly owned U.S. Pat. No. 6,926,621 of Lutz. et al., hereby incorporated herein in its entirety. With such surface pretreatments, the silane adhesion promoter, either neat (without solvent) or in solution, is exposed to or applied about the outer surface of one layer before mating or otherwise joining it with a second layer. The silane adhesion promoter provides a reactive surface for creating strong bonds between the treated layer and an adjacent different layer. However, silane-containing adhesion promoters have undesirably limited shelf lives once performed/applied and will fail to provide adequate adhesion between those layers unless molding follows within a short specified time window of the surface pretreatment or application of the tie layer.

Silanes have also previously been included within golf ball layers, but as intralayer coupling agents or crosslinking catalysts wherein any free functional groups of the silanes are solely dedicated to facilitating bonding/crosslinking of ingredients inside the layer—for example, between butadiene and fillers.

There is a need, however, for golf balls having the excellent interlayer adhesive strength between adjacent differing layers created by silane-containing surface-pretreatments and tie layers without the need for such additional processing steps or the timing limitations associated therewith. Such golf balls would improve golf ball manufacturing efficiency (e.g., time savings), flexibility and meanwhile reduce the cost of making the golf ball. The present inventive golf ball and method of making same addresses and solves these needs.

SUMMARY OF THE INVENTION

Accordingly, in a golf ball of the invention, excellent interlayer adhesion is created between differing adjacent golf ball layers without the need for either an added surface pretreating step or adding a tie layer there between prior to forming one layer about the other. In particular, a golf ball of the invention comprises a first layer comprising a first polymeric composition and surrounded by and adjacent to a second layer that comprises a second polymeric composition different than the first polymeric composition.

Only one of the first layer and the second layer further comprises at least one silane-containing adhesion promoter throughout in an amount of from about 0.1 wt. % to about 5.0 wt. of the layer composition. Neither the first layer nor the second layer is surface pretreated with any silane-containing adhesion promoter; and no silane-containing tie layer is disposed at an interface between the first layer and the second layer.

In a golf ball of the invention, the at least one silane-containing adhesion promoter may be selected, for example, from the group consisting of organosilanes or organosiloxanes.

The at least one silane-containing adhesion promoter may be incorporated in the first layer or the second layer in numerous ways. For example, the at least one silane-containing adhesion promoter may be mixed with a prepolymer of the first polymeric composition or the second polymeric composition to form a silane-containing prepolymer that is mixed with a curative.

Alternatively, the at least one silane-containing adhesion promoter may be mixed with the curative of the first polymeric composition or the second polymeric composition to form a silane-containing curative that is mixed with the prepolymer.

In another embodiment, the first layer or the second layer is formed from a master batch comprising the at least one silane-containing adhesion promoter and the first polymeric composition or the second polymeric composition.

In yet another embodiment, the first polymeric composition or the second polymeric composition may be combined with the silane-containing adhesion promoter by adding the silane-containing adhesion promoter to at least one pellet (typically a plurality of pellets) comprised of the first polymeric composition or the second polymeric composition. For example, the pellets may be soaked or dipped in a solution comprising the silane-containing adhesion promoter. In a different embodiment, the at least one silane-containing adhesion promoter may be mixed with the first polymeric composition or the second polymeric composition by compounding.

In one embodiment, the first polymeric composition is a non-polyurethane composition and the second polymeric composition is a polyurethane composition. In another embodiment, the first polymeric composition is a polyurethane composition and the second polymeric composition is a non-polyurethane composition. The non-polyurethane composition may be an ionomer, for example. In an alternative embodiment, the first polymeric composition is a non-polyurea composition and the second polymeric composition is a polyurea composition. Or, the first polymeric composition may be a polyurea composition and the second polymeric composition may be a non-polyurea composition. In yet another embodiment, the first polymeric composition is a non-polyurethane/urea hybrid composition and the second polymeric composition is a polyurethane/urea hybrid composition. Or, the first polymeric composition may be a polyurethane/urea hybrid composition and the second polymeric composition may be a non-polyurethane/urea hybrid composition.

In a different embodiment, the first polymeric composition is a non-rubber composition and the second polymeric composition is different a non-rubber composition.

It is envisioned that the first polymeric composition and the second polymeric composition may each be any polymeric composition suitable for forming a golf ball layer, as long as the first polymeric composition and the second polymeric composition differ in some respect such as having different chemical and/or physical properties or being otherwise incompatible.

In one embodiment, the first layer comprises the at least one silane-containing adhesion promoter and the first polymeric composition, and the second layer comprises the second polymeric composition; wherein the first composition comprises at least one of a thermoplastic or thermoset polyurethane, a urea, a polyurethane/urea hybrid, an ionomer, a polyamide, a polyester, or a rubber; and wherein the second layer comprises at least one different thermoplastic or thermoset polyurethane, urea, a polyurethane/urea hybrid, ionomer, polyamide, polyester, or rubber.

In another embodiment, the first layer comprises the first polymeric composition, and the second layer comprises the at least one silane-containing adhesion promoter and the second polymeric composition; wherein the first composition comprises at least one of a thermoplastic or thermoset polyurethane, a urea, a polyurethane/urea hybrid, an ionomer, a polyamide, a polyester, or a rubber; and wherein the second polymeric composition comprises at least one different thermoplastic or thermoset polyurethane, urea, polyurethane/urea hybrid, ionomer, polyamide, polyester, or rubber.

In yet another embodiment, the first layer consists of the first polymeric composition and the at least one silane-containing adhesion promoter; and the second layer consists of the second polymeric composition. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

In still another embodiment, the first layer consists of the first polymeric composition; and the second layer consists of both the second polymeric composition and the at least one silane-containing adhesion promoter. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

In one embodiment, the first layer is at least one of opaque, transparent and translucent, and the second layer is at least one of transparent and translucent. However, embodiments are also envisioned wherein the second layer is opaque.

The construction of a golf ball of the invention is not otherwise limited regarding the total number of golf ball layers or concerning properties between and within each layer. For example, in one embodiment, the second layer may surround a polybutadiene rubber core.

In one embodiment, the at least one silane-containing adhesion promoter has at least two functional groups. However, embodiments are also envisioned wherein the at least one silane-containing adhesion promoter has three or more functional groups.

Advantageously, the silane-containing adhesion promoter is distributed throughout the first layer or second layer. Thus, when the layer incorporating the silane-base adhesion promoter throughout is an intermediate layer that is disposed between inner and outer layers which differ from the intermediate layer in some way, excellent adhesion may be created simultaneously between the intermediate layer and the inner layer as well as between the intermediate layer and the outer layer without the need for multiple surface pre-treatments or multiple tie layers, or some combination thereof.

For example, in one embodiment, the second layer comprises the at least one silane-containing adhesion promoter and is surrounded by and adjacent to a third layer that does not comprise any silane-containing adhesion promoter. In this embodiment, the second layer is comprised of a polymeric composition that differs from that of both the first layer and the second layer. And excellent adhesion is advantageously created both between the first layer and second layer as well as between the second layer and third layer without the need to perform any surface-treating process steps and/or form tie layers at the respective interfaces. Previously, two separate surface-treatments/tie layers would typically be performed, either: on the outer surface of the first layer and an inner surface of the third layer; or on the inner and outer surfaces of the second layer.

In one particular embodiment of such a golf ball of the invention, the first layer consists of a thermoset polyurethane composition; the second layer surrounds and is adjacent to the first layer and comprises an ionomer composition with at least one silane-containing adhesion promoter throughout; and a third layer surrounds and is adjacent to the second layer and consists of a thermoplastic polyurethane composition.

The invention is also directed to a method of making a golf ball of the invention, comprising providing a first layer that comprises a first polymeric composition; forming a second layer about and adjacent to the first layer wherein the second layer comprises a second polymeric composition that is different than the first polymeric composition; wherein only one of the first layer and the second layer further comprises at least one silane-containing adhesion promoter throughout in an amount of from about 0.1 wt. % to about 5.0 wt. %; and wherein the first layer and the second layer are not surface treated with at least one silane-containing adhesion promoter. Nor is any silane-containing adhesion promoter tie layer disposed between the first layer and second layer.

The first layer and/or the second layer, as well as any third layer, etc., may be formed during a molding process selected from the group consisting of compression molding; injection molding; and casting.

DETAILED DESCRIPTION

As introduced above, many multi-layer golf balls formed of differing or incompatible layers require surface pretreatment or the use of an adhesive or adhesion promoter applied to core or casing layer prior to over-molding with a cover material or other outer layer in order to ensure adequate cover adhesion and to prevent potential shear/cut issues. A golf ball of the invention advantageously and cost effectively displays and achieves excellent adhesion between two differing adjacent golf ball layers without the need for an added tie layer there between and also without the need for an added processing step of pretreating a surface of one of first and second layers before forming the second layer about the first.

In a golf ball of the invention, an outer surface of the first layer interacts directly with an inner surface of the second layer at an interface or boundary between the two layers, strong interlayer adhesion being created when one of the two differing layers comprises the silane-containing adhesion promoter throughout in an amount of from about 0.1 wt. % to about 5 wt. % of the total layer composition. In a golf ball of the invention, the silane-containing adhesion promoter is included throughout the layer with sufficient functional groups available for facilitating and creating strong bonding between that layer and an adjacent differing golf ball layer notwithstanding any functional groups that are dedicated to facilitating crosslinking of or bonding between ingredients within the layer.

In other embodiments, one of the first layer and the second layer comprises the at least one silane-containing adhesion promoter in an amount of from about 0.1 wt. % to about 4.5 wt. % of the entire layer; or in an amount of from about 0.1 wt. % to about 4.0 wt. % of the entire layer; or in an amount of from about 0.1 wt. % to about 3.5 wt. % of the entire layer; or in an amount of from about 0.1 wt. % to about 3.0 wt. % of the entire layer; or in an amount of from about 0.1 wt. % to about 2.0 wt. % of the entire layer; or in an amount of from about 0.1 wt. % to about 1.0 wt. % of the entire layer; or in an amount of from about 1.0 wt. % to about 2.0 wt. % of the entire layer; or in an amount of from about 1.0 wt. % to about 3.0 wt. % of the entire layer; or in an amount of from about 0.5 wt. % to about 1.5 wt. % of the entire layer. These amounts are in addition to any silane used as a crosslinker or other interlayer bonding of materials.

The silane-containing adhesion promoter may for example be added to a master batch of either the first composition or second composition. Alternatively, the silane-containing adhesion promoter may be pre-mixed or otherwise combined with one or more ingredients forming the first composition or the second composition.

In golf balls of the invention, the first and second layers differ in at least one way other than the presence/absence of silane adhesion promoter. For example, the first and second layers may have different chemical and/or physical properties.

Golf balls of the invention demonstrate excellent cover to casing adhesion by adding silanes directly into the material of one of the differing adjacent layers. Thus, overall excellent adhesion, for example, of a polyurethane/urea/polyurethane/urea hybrid cover material to an underlying ionomeric layer is created, meanwhile eliminating the need for the additional surface-treating processing step or an additional tie layer.

And advantageously, embodiments are possible wherein the second layer, comprising the at least one silane-containing adhesion promoter, is an intermediate layer between the first layer and a differing third layer that does not comprise any silane-containing adhesion promoter and surrounds and is adjacent to the second layer. In this embodiment, excellent adhesion is advantageously created not only between the second layer and the first layer, but also between the second layer and the third layer without the need to perform any surface-treating process steps or to position a tie layer at any of the respective interfaces there between. Previously, two separate surface-treatments would be necessary, for example: on the outer surface of the first layer and an inner surface of the third layer; or on the inner surface and outer surface of the second layer.

In one particular embodiment of such a golf ball of the invention, the first layer consists of a thermoset polyurethane composition; the second layer surrounds and is adjacent to the first layer and comprises an ionomer composition with at least one silane-containing adhesion promoter throughout; and a third layer surrounds and is adjacent to the second layer and consists of a thermoplastic polyurethane composition.

Silane-containing adhesion promoters may include, for example, organosilanes, organosiloxanes, and combinations thereof. Non-limiting examples of suitable silanes include silane esters; vinyl silanes; methacryloxy silanes; epoxy silanes; sulfur silanes; amino silanes; ureido silanes; or a mixture thereof. Preferably, the silanes include silane esters, octyltriethoxysilane, methyltriethoxylsilane, methyltrimethoxysilane, nonionic silane dispersing agents; vinyl silanes, vinyltriethoxysilane, vinyltrimethoxysilane, vinyl-tris-(2-methoxyethoxy) silane, vinylmethyldimethoxysilane; methacryloxy silanes, γ-methacryloxypropyltrimethoxysilane; epoxy silanes, β-(3,4-epoxycyclohexyl) ethyltrimethoxysilane, γ-glycidoxypropyltrimethoxysilane; sulfur silanes, γ-mercaptopropyltrimethoxysilane proprietary polysulfidesilane, bis-(3-[triethoxisily]-propyl)-tetrasulfane; γ-aminopropyltriethoxysilane, aminoalkyl silicone solution, modified aminoorganosilanes, n-β-(aminoethyl)-γ-aminopropyltrimethoxysilane, modified aminoorganosilanes, modified aminosilanes, triaminofunctional silanes, bis-(γ-trimethoxysilylpropyl)amine, n-phenyl-γ-aminopropyltrimethoxysilane, organomodified polydimethylsiloxane, polyamide silane, n-β-(aminoethyl)-γ-aminopropylmethyldimethoxysilane; ureido silanes, γ-ureidopropyltrialkoxysilane, γ-ureidopropyltrimethoxysilane; isocyanate silanes, γ-isocyanatopropyltriethoxysilane; or mixtures thereof.

Suitable cover materials include, for example, thermoplastic polyurethanes, ureas, polyurethane/urea hybrids, ionomers, HNP type ionomers, polyamides, polyesters, etc.

Examples of the numerous possible constructions are as follows. In one embodiment, a golf ball of the invention may have at least three layers—a thermoplastic polyurethane cover surrounding and adjacent to an ionomer or HNP casing layer, which surrounds a crosslinked polybutadiene core of one or more layers. In another embodiment, a golf ball of the invention may be at least a two-piece golf ball with a thermoplastic polyurethane cover formed about a thermoset or thermoplastic core comprised of one or more different compositions than the cover.

The silane-containing adhesion promoter(s) may be incorporated throughout a layer in numerous ways. In one embodiment, thermoplastic polyurethane pellets may be soaked in a silane-containing adhesion promoter solution for a duration sufficient for the pellets to become soaked with the silane containing adhesion promoter solution, followed by drying of the silane-soaked thermoplastic polyurethane pellets. The silane-soaked thermoplastic polyurethane pellets are then injection molded over an ionomer casing, resulting, and excellent adhesion is created between the two layers.

In a second non-limiting embodiment, ionomer pellets may be soaked in a silane-containing adhesion promoter solution for a duration sufficient for the pellets to become soaked with the silane solution and the silane-soaked ionomer pellets are then allowed to dry, followed by casing molding via RPIM (retractable pin injection molding). A thermoplastic polyurethane cover may then be molded over the casing layer containing the silane-containing adhesion promoter, resulting in improved adhesion between the casing layer and the surrounding and adjacent cover layer. In another embodiment, the casing layer may be formed from a silane masterbatch and ionomer, which is overmolded with a thermoset polyurethane/urea/polyurethane/urea hybrid cover material.

Silane-containing adhesion promoter surface treatments can fail to provide adequate adhesion unless the outer layer molding follows within a specified time window of the surface pretreatment due to the limited shelf life of silane adhesion promoters. In contrast, with golf balls and methods of the invention, such urgency in molding timing is not an issue because the silane-containing adhesion promoter compositions of golf balls of the invention can be stored for example in a master batch within a drum until it is time to form the composition into a layer.

Improved cover to casing adhesion has a direct positive effect on cover shear durability and overall golf ball durability. Accordingly, as set forth in TABLE I below, several inventive golf balls Ex. 1, Ex. 2 and Ex. 3 were made and compared with comparative golf balls Comp. Ex. 1 and Comp. Ex. 2 in order to test and demonstrate the quality of adhesion between a cover layer material incorporating a silane-containing adhesion promoter throughout with an adjacent, differing inner layer (different apart from presence/absence of silane-containing adhesion promoter).

TABLE I

| | Example No. | | | | |
|---|---|---|---|---|---|
| | I | II | III | Comp. Ex. 1 | Comp. Ex. 2 |
| Adhesion Promoter/ Compound Class | Silquest A-1170 Silane | Silquest A-1120 Silane | Silquest A-187 Silane | CX-100 Aziridine | Corona |
| Method | Molded in | Molded in | Molded in | Dip | Surface treatment |
| % Content | 1.5% w/w total | 1.5% w/w total | 1.5% w/w total | 2% Solution in acetone; 1 min; RT | |

In this regard, referring to TABLE I, inventive golf balls Ex. 1, Ex. 2 and Ex. 3 and comparative golf balls Comp. Ex. 1 and Comp. Ex. 2 have identical constructions and formulations except with respect to how improved adhesion is attempted between the differing cover and casing layers. Each golf ball incorporated a cased core and a non-pigmented, clear thermoset polyurethane cover.

The same polybutadiene-based core having an outer diameter of 1.550 inches and the same compression of 80-90; surrounded by a casing layer formed from an ionomer resin blend and having an outer diameter of about 1.62 in., and a thickness of 0.035 in. The ionomer resins are available from Dupont.

The covers were clear and non-pigmented in order to facilitate visual inspection for incidence of delamination. Each cover incorporated a two part cast polyurethane resin.

And finally, each golf ball was painted with a clear topcoat in order to replicate a normal finished golf ball coefficient of friction.

Distinguishably, the cover formulations for golf balls Ex. 1, Ex. 2 and Ex. 3 incorporated at least one silane-containing adhesion promoter throughout to be dedicated to creating strong bonds between the cover and casing, whereas the cover of comparative golf ball Comp. Ex. 2 did not. Specifically, golf ball Ex. 1 included Silquest A-1170 (a secondary aminofunctional bis-silane) throughout, golf ball Ex. 2 included Silquest A-1120 (diamino functional silane) throughout, and golf ball Ex. 3 included Silquest A-187 (epoxy-functional silane) throughout. Each are available from Momentive Performance Materials, Inc.

These silane adhesion promoters were added directly to the prepolymer in amounts of approximately 1.5% (by weight of total polymer), followed by mixing of the prepolymer and curative, and then cast golf balls were made. Only the cased core of comparative golf ball Comp. Ex. 2 was Corona treated.

The cover of comparative golf ball Comp. Ex. 1 did not incorporate a silane-containing adhesion promoter, but rather, a tie layer consisting of a mixture of a polyfunctional aziridine compound and acetone in a wt. % ratio of 2:98 was formed about the casing layer before forming the cover layer thereabout. The polyfunctional aziridine compound used was CX-100, available from DSM Coating Resins LLC.

Specifically, this tie layer was formed about the entire outer surface of the casing layer of comparative golf ball Comp. Ex. 1 by dipping the cased core into the mixture prior to forming cover layer thereabout in accordance with the teachings of co-owned U.S. patent application Ser. No. 14/569,021, filed on Dec. 11, 2014, which is hereby incorporated by reference herein in its entirety. The tie layer interacted with both the casing layer and the cover layer materials at an interface there between during molding.

The cover of comparative golf ball Comp. Ex. 2 did not incorporate a silane-containing adhesion promoter either. Instead, the cased core outer surface was Corona pretreated before molding the cover about the casing layer without a silane-containing adhesion promoter being incorporated in the cover material. Corona discharge, well known by those of ordinary skill in the art, typically involves an electrical discharge that causes oxygen or other gas molecules within the discharge area to break into their atomic form, leaving them free to bond onto molecules on the surface of the treated article. See, e.g., U.S. Pat. Nos. 6,609,982, 5,466,424 (corona discharge surface treating method) and Stobbe, Bruce, "Corona Treatment 101," *Label and Narrow Web Indus.*, May-June, 1996, the entireties of each are hereby incorporated by reference herein.

Accordingly, in golf balls Ex. 1, Ex. 2 and Ex. 3, the casing and cover became in direct contact at an interface there between when the cover was formed about the casing layer and the two surfaces interacted—without any prior surface Corona or chemical pretreatment, and without the need for any tie layer there between.

All 120 golf balls were allowed to cure for 7 days and then were soaked in water for 7 more days, at which time each golf ball was removed from the water, dried off, and fired once using a "Shear Impact Air Cannon" at approximately 135 ft./sec. into a grooved plate at an angle of about 35° from horizontal. All golf balls were subsequently visually examined for any delamination of the cover from the casing layer.

TABLE II reveals that none of the 72 inventive golf balls Ex. 1, Ex. 2, Ex. 3 visually failed. None of the comparative golf balls Comp. Ex. 1 incorporating an additional aziradine-based tie layer failed either. However, 17 out of 24 (or about 70.8%) of the Corona surface pretreated golf balls Comp. Ex. 2 did visually fail:

TABLE II

| | | EXAMPLES | | | | |
|---|---|---|---|---|---|---|
| Test Procedure | Measurements | Golf Ball Ex. 1 | Golf Ball Ex. 2 | Golf Ball Ex. 3 | Comp. Golf Ball Ex. 1 | Comp. Golf Ball Ex. 2 |
| Visual Failure of Water Soaked Golf Balls after Impact | No. of Golf Balls Hit | 24 | 24 | 24 | 24 | 24 |
| | No. of Failures | 0 | 0 | 0 | 0 | 17 |

Accordingly, it is evident that a golf ball of the invention incorporating at least one silane-containing adhesion promoter within/throughout the layer formulation of one of two differing and/or otherwise incompatible adjacent layers produces excellent adhesive strength/adhesion at the boundary/interface between those two layers when the at least one adhesion promoter is included with sufficient functional groups dedicated to facilitating and creating strong bonding between the two otherwise incompatible layers. In the example above, excellent adhesion was created between the ionomeric casing layer and the cover layer comprised of polyurethane and silane-containing adhesion promoter throughout.

And excellent adhesion can simultaneously be created between the cover layer of golf balls Ex. 1, Ex. 2 and Ex. 3 and the surrounding paint layer (clear coat) where that formulation differs from that of the cover layer—all without the need for any surface treatment or adhesive of tie layer. The at least one silane-containing adhesion promoter has free functional groups that facilitate and create strong interlayer bonding between the first layer and the second layer.

The examples above are for illustrative purposes only and should not be construed as limiting the present invention in any way.

Advantageously, in a golf ball and/or method of the invention, the silane-containing adhesion promoter may be incorporated into the first layer or second layer at any time prior to curing or molding of the layer containing the silane-containing adhesion promoter and distributes throughout the second layer.

Numerous specific constructions of a golf ball of the invention are envisioned as being suitable for incorporating the first and second layers. For example, in an embodiment as described above wherein the first layer surrounds a polybutadiene rubber inner core, the first layer may be any intermediate layer such as an outer core layer, a casing layer, or an inner cover layer. Of course it is also envisioned that the first layer may be the inner core itself.

Meanwhile, a second layer may be any layer except the innermost layer of the golf ball, as long as the second layer surrounds the first layer and is adjacent to it such that direct interactions can occur between surfaces of the first layer and second layer at an interface there between.

In one embodiment, the first layer consists of the first polymeric composition and the at least one silane-containing adhesion promoter; and the second layer consists of the second polymeric composition. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

In another embodiment, the first layer consists of the first polymeric composition; and the second layer consists of both the second polymeric composition and the at least one silane-containing adhesion promoter. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

In yet another embodiment, the first layer comprises the first polymeric composition and the at least one silane-containing adhesion promoter; and the second layer consists of the second polymeric composition. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

In still another embodiment, the first layer consists of the first polymeric composition; and the second layer comprises both the second polymeric composition and the at least one silane-containing adhesion promoter. In this embodiment, the first polymeric composition comprises at least one of a thermoplastic or thermoset polyurethane, a urea, a polyurethane/urea hybrid, an ionomer, a polyamide, a polyester, or a rubber; and the second polymeric composition comprises at least one different thermoplastic or thermoset polyurethane, urea, polyurethane/urea hybrid, ionomer, polyamide, polyester, or rubber.

A golf ball of the invention may otherwise have any known construction as long as there are two adjacent layers therein that are formed form different compositions or are otherwise incompatible in that they would bond together poorly without the help of an adhesion promoting surface pretreatment or tie layer, etc. In one particular embodiment of a golf ball of the invention, the first layer is formed about a rubber-containing core, wherein the base rubber may be selected from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers.

Suitable curing processes include, for example, peroxide curing, sulfur curing, radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free-radical initiators are generally present in the rubber compositions in an amount within the range of 0.05 to 15 parts, preferably 0.1 to 10 parts, and more preferably 0.25 to 6 parts by weight per 100 parts of the base rubber. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates, methacrylates, and dimethacrylates. When the cross-linking agent is zinc diacrylate and/or zinc dimethacrylate, the agent typically is included in the rubber composition in an amount within the range of 1 to 60 parts, preferably 5 to 50 parts, and more preferably 10 to 40 parts, by weight per 100 parts of the base rubber.

In a preferred embodiment, the cross-linking agent used in the rubber composition of the core and epoxy composition of the intermediate layer and/or cover layer is zinc diacrylate ("ZDA"). Adding the ZDA curing agent to the rubber composition makes the core harder and improves the resiliency and COR of the ball. Adding the same ZDA curing agent epoxy composition makes the intermediate and cover layers harder and more rigid. As a result, the overall durability, toughness, and impact strength of the ball is improved.

Sulfur and sulfur-based curing agents with optional accelerators may be used in combination with or in replacement of the peroxide initiators to cross-link the base rubber. High energy radiation sources capable of generating free-radicals may also be used to cross-link the base rubber. Suitable examples of such radiation sources include, for example, electron beams, ultra-violet radiation, gamma radiation, X-ray radiation, infrared radiation, heat, and combinations thereof.

The rubber compositions may also contain "soft and fast" agents such as a halogenated organosulfur, organic disulfide, or inorganic disulfide compound. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95. ZnPCTP is commercially available from EchinaChem (San Francisco, Calif.). These compounds also may function as cis-to-trans catalysts to convert some cis-1,4 bonds in the polybutadiene to trans-1,4 bonds. Peroxide free-radical initiators are generally present in the rubber compositions in an amount within the range of 0.05 to 10 parts and preferably 0.1 to 5 parts. Antioxidants also may be added to the rubber compositions to prevent the breakdown of the elastomers. Other ingredients such as accelerators (for example, tetra methylthiuram), processing aids, processing oils, dyes and pigments, wetting agents, surfactants, plasticizers, as well as other additives known in the art may be added to the composition. Generally, the fillers and other additives are present in the rubber composition in an amount within the range of 1 to 70 parts by weight per 100 parts of the base rubber. The core may be formed by mixing and forming the rubber composition using conventional techniques. Of course, embodiments are also envisioned wherein outer layers comprise such rubber-based compositions Cores, intermediate/casing layers, and cover layers may be formed from an ionomeric material including ionomeric polymers, preferably highly-neutralized ionomers (HNP). In another embodiment, the intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer-("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any golf ball component, namely core, intermediate layer, cover, etc. may also be formed from or comprise or include or be blended or otherwise combined or mixed with any of the following compositions as known in the art to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;

(2) Polyureas, such as those disclosed in U.S. Pat. Nos. 5,484,870 and 6,835,794; and (3) Polyurethane/urea hybrids, blends or copolymers comprising urethane and urea segments such as those disclosed in U.S. Pat. No. 8,506,424.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

In general, polyurea compositions contain urea linkages formed by reacting an isocyanate group (—N=C=O) with an amine group (NH or $NH_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

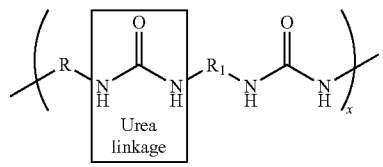

where x is the chain length, i.e., about 1 or greater, and R and $R_1$ are straight chain or branched hydrocarbon chains having about 1 to about 20 carbon atoms.

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

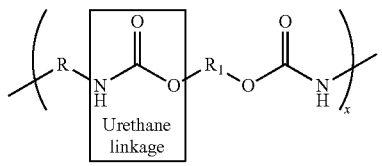

where x is the chain length, i.e., about 1 or greater, and R and $R_1$ are straight chain or branched hydrocarbon chains having about 1 to about 20 carbon atoms.

There are two basic techniques that can be used to make the polyurea and polyurea/urethane compositions of this invention: a) one-shot technique, and b) prepolymer technique. In the one-shot technique, the isocyanate blend, polyamine, and hydroxyl and/or amine-terminated curing agent are reacted in one step. On the other hand, the prepolymer technique involves a first reaction between the isocyanate blend and polyamine to produce a polyurea prepolymer, and a subsequent reaction between the prepolymer and hydroxyl and/or amine-terminated curing agent. As a result of the reaction between the isocyanate and polyamine compounds, there will be some unreacted NCO groups in the polyurea prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurea and polyurea/urethane compositions of the invention; however, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

In the casting process, the polyurea and polyurea/urethane compositions can be formed by chain-extending the polyurea prepolymer with a single curing agent or blend of curing agents as described further below. The compositions of the present invention may be selected from among both castable thermoplastic and thermoset materials. Thermoplastic polyurea compositions are typically formed by reacting the isocyanate blend and polyamines at a 1:1 stoichiometric ratio. Thermoset compositions, on the other hand, are cross-linked polymers and are typically produced from the reaction of the isocyanate blend and polyamines at normally a 1.05:1 stoichiometric ratio. In general, thermoset polyurea compositions are easier to prepare than thermoplastic polyureas.

The polyurea prepolymer can be chain-extended by reacting it with a single curing agent or blend of curing agents (chain-extenders). In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediyl-bis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-di-amino-cyclohexane, 1,4-diamino-cyclohexane, poly(oxyethylene-oxypropylene) diamines, 1,3- or 1,4-bis(methyl-amino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea/urethane hybrid.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

In an alternative embodiment, the cover layer is formed from a polyurethane or polyurethane/urea hybrid composition. In general, polyurethane compositions contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

Suitable isocyanate compounds that can be used to prepare the polyurethane or polyurethane/urea hybrid material are described above. These isocyanate compounds are able to react with the hydroxyl or amine compounds and form a durable and tough polymer having a high melting point. The resulting polyurethane generally has good mechanical strength and cut/shear-resistance. In addition, the polyurethane composition has good light and thermal-stability.

When forming a polyurethane prepolymer, any suitable polyol may be reacted with the above-described isocyanate blends in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

In a manner similar to making the above-described polyurea compositions, there are two basic techniques that can be used to make the polyurethane compositions of this invention: a) one-shot technique, and b) prepolymer technique. In the one-shot technique, the isocyanate blend, polyol, and hydroxyl-terminated and/or amine-terminated chain-extender (curing agent) are reacted in one step. On the other hand, the prepolymer technique involves a first reaction between the isocyanate blend and polyol compounds to produce a polyurethane prepolymer, and a subsequent reaction between the prepolymer and hydroxyl-terminated and/or amine-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is in the range of about 1.01:1.00 to about 1.10:1.00. Preferably, the molar ratio is greater than or equal to 1.05:1.00. For example, the molar ratio can be in the range of 1.05:1.00 to 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single curing agent (chain-extender) or blend of curing agents (chain-extenders) as described further below. The compositions of the present invention may be selected from among both castable thermoplastic and thermoset polyurethanes. Thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio. In general, thermoset polyurethane compositions are easier to prepare than thermoplastic polyurethanes.

As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyol compounds for producing the polyurethane prepolymer or between the polyurethane prepolymer and chain-extender during the chain-extending step. Preferably, the catalyst is added to the reactants before producing the polyurethane prepolymer. Suitable catalysts include, but are not limited to, the catalysts described above for making the polyurea prepolymer. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable hydroxyl chain-extending (curing) agents and amine chain-extending (curing) agents include, but are not limited to, the curing agents described above for making the polyurea and polyurea/urethane hybrid compositions. When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Meanwhile, the dimensions of each golf ball component such as the diameter of the core and respective thicknesses of the intermediate layer (s), cover layer(s) and coating layer(s) may be selected and coordinated as known in the art for targeting and achieving desired playing characteristics or feel. For example, the core may have a diameter of from about 1.47 inches (in.) to about 1.62 in.; the intermediate/casing layer may have a thickness of from about 0.025 in. to about 0.057 in.; a core and intermediate/casing layer, combined, may have a diameter of from about 1.57 in. to about 1.65 in.; the cover may have a thickness of from about 0.015 in. to about 0.055 in.; and any coating layers may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

A golf ball of the invention may also incorporate indicia such any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising a first layer that comprises an ionomer composition and is surrounded by and adjacent to a second layer comprising a thermoset polyurethane composition;
    wherein only the second layer further comprises at least one silane-containing adhesion promoter throughout and in an amount of from about 0.1 wt. % to about 5.0 wt. %; and
    wherein the first layer and the second layer are not surface treated with any adhesion promoter at an interface between the first layer and second layer.

2. The golf ball of claim 1, wherein the at least one silane-containing adhesion promoter is selected from the group consisting of organosilanes and organosiloxanes.

3. The golf ball of claim 1, wherein the at least one silane-containing adhesion promoter is mixed with a prepolymer of the thermoset polyurethane composition to form a silane-containing prepolymer that is mixed with a curative.

4. The golf ball of claim 1, wherein the at least one silane-containing adhesion promoter is mixed with a curative of the thermoset polyurethane composition to form a silane-containing curative that is mixed with a prepolymer.

5. The golf ball of claim 1, wherein the second layer comprises a silane-containing master batch and the thermoset polyurethane composition.

6. The golf ball of claim 1, wherein the composition is combined with the at least one silane-containing adhesion promoter by adding it to at least one pellet comprising the thermoset polyurethane composition.

7. The golf ball of claim 6, wherein the at least one pellet is soaked or dipped in a solution comprising the at least one silane-containing adhesion promoter.

8. The golf ball of claim 1, wherein the at least one silane-containing adhesion promoter is mixed with the thermoset polyurethane composition by compounding.

9. The golf ball of claim 1, wherein the first layer is at least one of opaque, transparent and translucent and the second layer is at least one of transparent and translucent.

10. The golf ball of claim 1, wherein the first layer surrounds a core comprising polybutadiene.

11. The golf ball of claim 1, wherein the at least one silane-containing adhesion promoter has at least two functional groups.

12. The golf ball of claim 1, wherein the second layer comprising the at least one silane-containing adhesion promoter is surrounded by and adjacent to a third layer that consists of a polymeric composition that is not surface treated with nor comprised of at least one silane-containing adhesion promoter.

13. A method of making a golf ball comprising
providing a first layer comprising an ionomer composition;
forming a second layer about and adjacent to the first layer wherein the second layer comprises a thermoset polyurethane composition;
wherein only the second layer further comprises at least one silane-containing adhesion promoter throughout in an amount of from about 0.1 wt. % to about 5.0 wt. %; and
wherein the first layer and the second layer are not surface treated with any adhesion promoter at an interface between the first layer and second layer.

14. The method of making a golf ball of claim 13, wherein the at least one silane-containing adhesion promoter is selected from the group consisting of organosilanes and organosiloxanes.

15. The method of making a golf ball of claim 13, wherein the at least one silane-containing adhesion promoter is mixed with a prepolymer of the thermoset polyurethane composition to form a silane-containing prepolymer that is then mixed with a curative.

16. The method of making a golf ball of claim 13, wherein the at least one silane-containing adhesion promoter is mixed with a curative of the thermoset polyurethane composition to form a silane-containing curative that is then mixed with a prepolymer.

17. The method of making a golf ball of claim 13, wherein the second layer is formed from a master batch comprising the at least one silane-containing adhesion promoter and the thermoset polyurethane composition.

18. The method of making a golf ball of claim 13, wherein the thermoset polyurethane composition is combined with the silane-containing adhesion promoter by adding the silane-containing adhesion promoter to at least one pellet comprised of the composition thermoset polyurethane.

19. The method of making a golf ball of claim 18, wherein the at least one pellet is soaked or dipped in a solution comprising the silane-containing adhesion promoter.

20. The method of making a golf ball of claim 13, wherein the at least one silane-containing adhesion promoter is mixed with the thermoset polyurethane composition by compounding.

21. The method of making a golf ball of claim 13, wherein the second layer comprising the at least one silane-containing adhesion promoter is surrounded by and adjacent to a third layer that consists of a third polymeric composition different than the thermoset polyurethane composition and is not surface treated with nor comprises at least one silane-containing adhesion promoter.

22. The method of making a golf ball of claim 13, wherein the first layer and the second layer are formed by a molding process selected from the group consisting of compression molding; injection molding; and casting.

* * * * *